Aug. 25, 1931.  J. W. WHALEY  1,820,104
SEAT COVER
Filed April 17, 1930   3 Sheets-Sheet 1
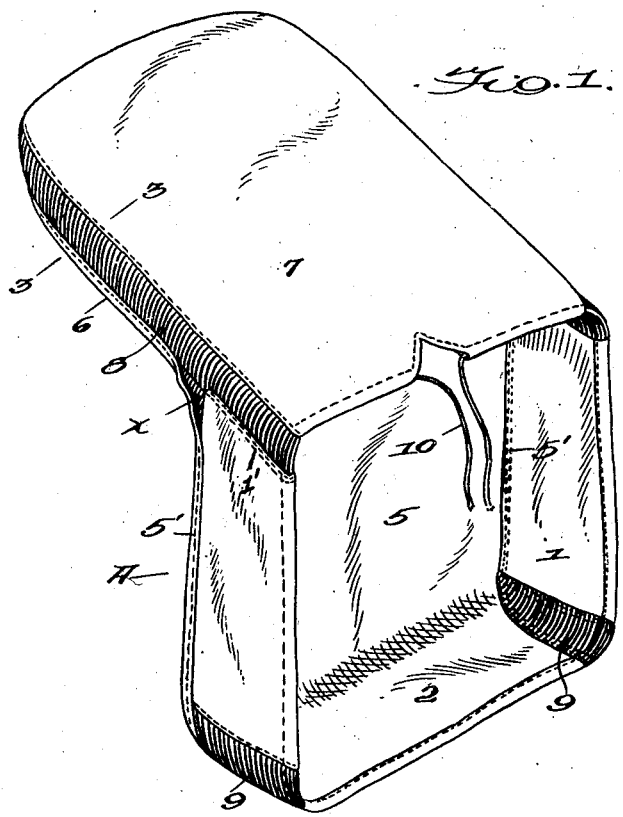
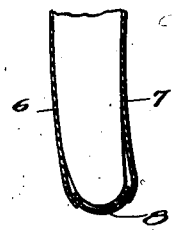
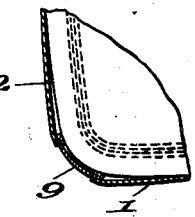
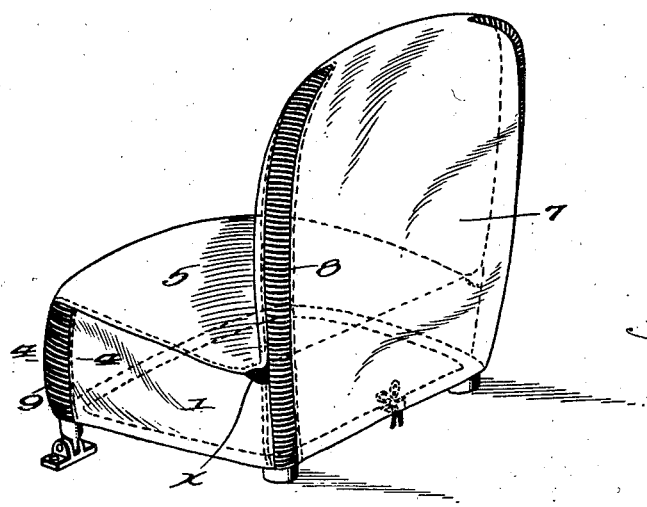
Inventor
John W. Whaley,
By
Attorney Aug. 25, 1931. J. W. WHALEY 1,820,104
SEAT COVER
Filed April 17, 1930 3 Sheets-Sheet 2
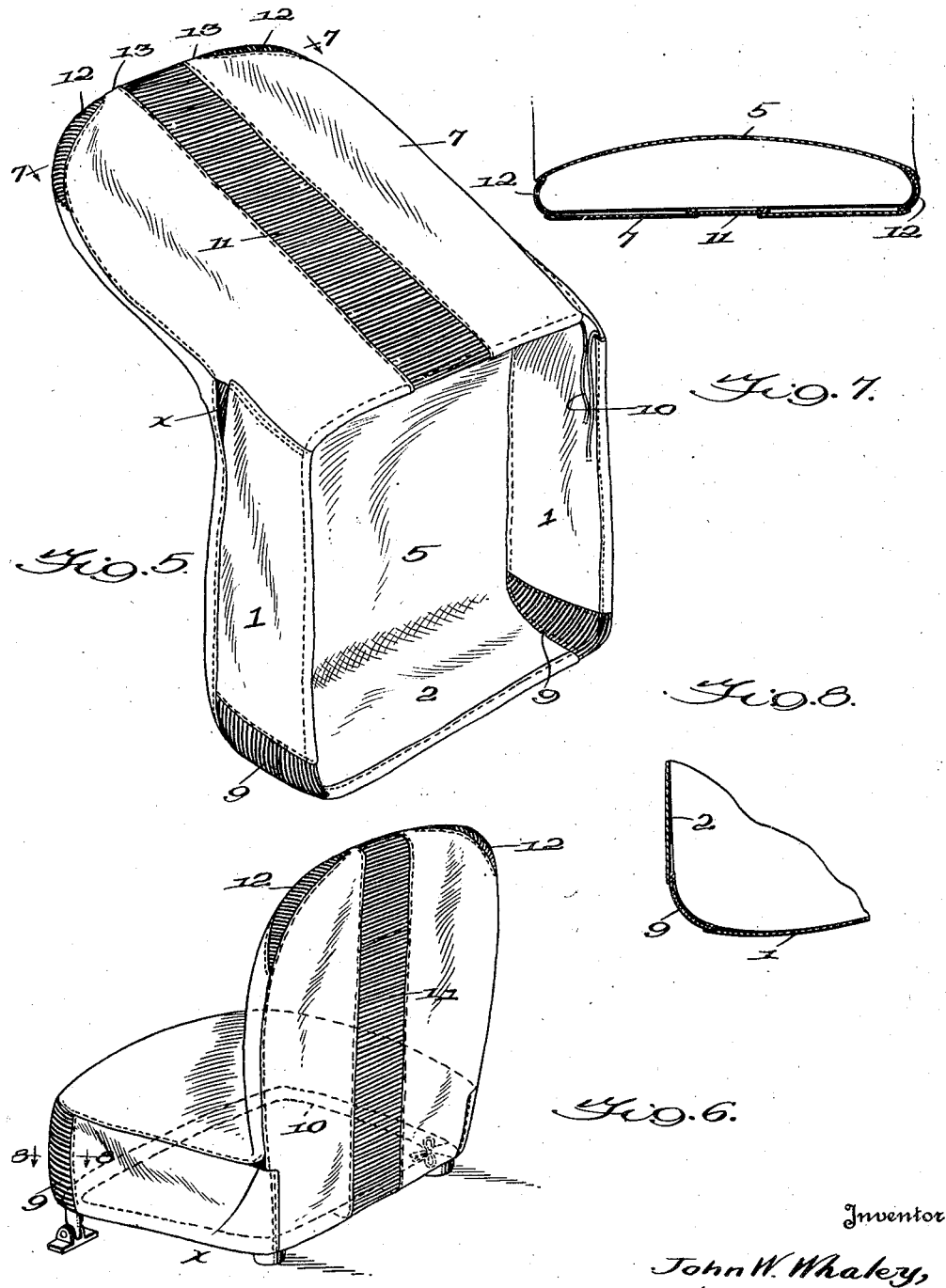

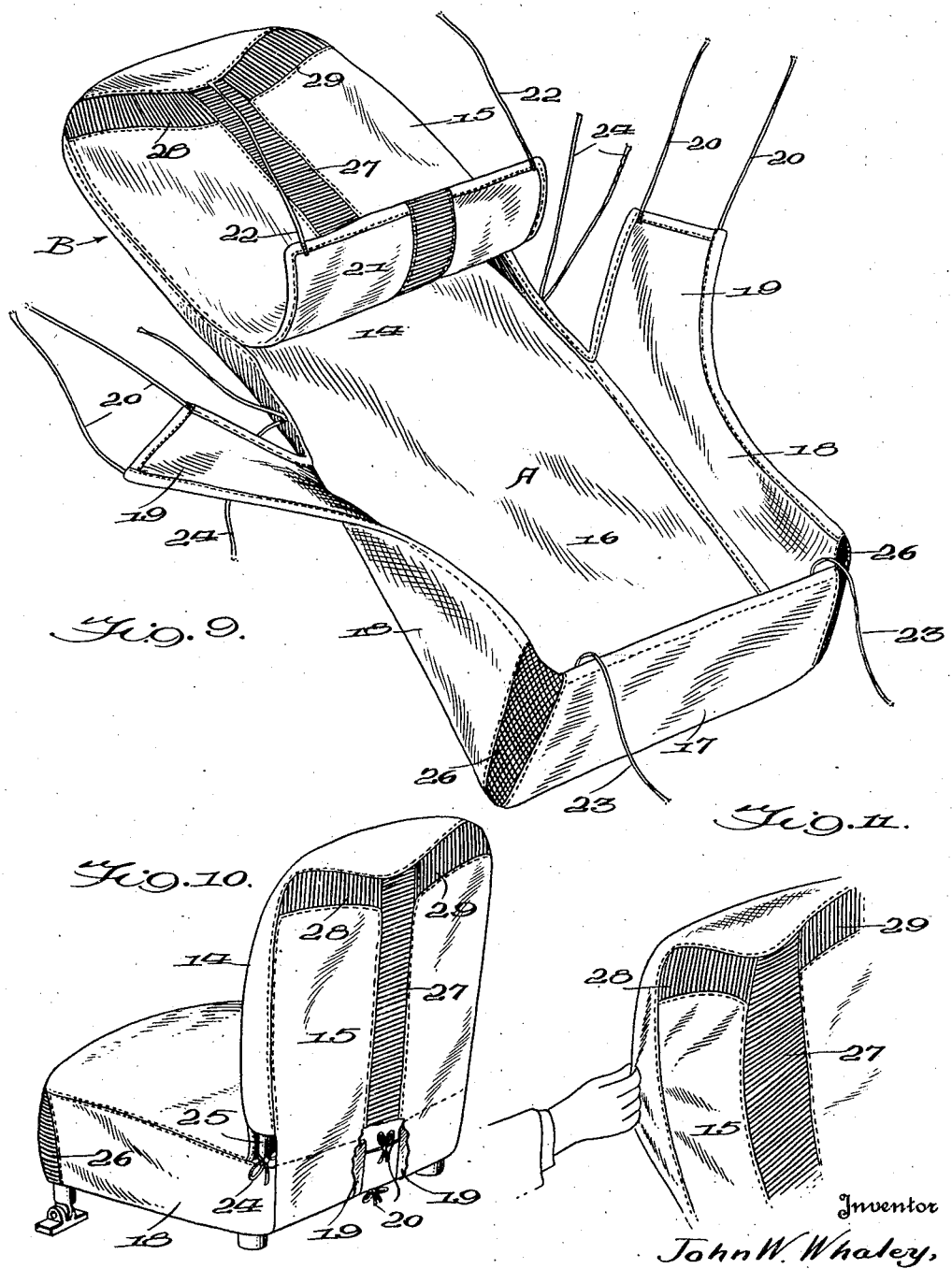

Patented Aug. 25, 1931

1,820,104

UNITED STATES PATENT OFFICE

JOHN W. WHALEY, OF RICHMOND, VIRGINIA

SEAT COVER

Application filed April 17, 1930. Serial No. 445,082.

This invention relates to slip covers for automobile seats, and more particularly to the provision of such a cover which may be economically fabricated, and easily applied to or removed from operative position.

The primary object of the invention is the provision, for automobile seats, of a slip cover which is initially shaped to provide connected pocket-like portions adapted to receive, respectively, the seat and back rest, and means for quickly securing said portions in operative position.

Another object of the invention is the provision, in such a cover, of a plurality of elastic inserts whereby to permit the application of the structure to seats and backs of different sizes, but of the same general conformation.

Other objects of the invention will be made apparent in the following specifications, when read in connection with the accompanying drawings forming a part thereof.

In said drawings:

Fig. 1 is a perspective view showing a box-like structure preformed to adapt it to fit over the seat and back portion of a chair.

Fig. 2 is a similar view showing the cover secured to operative position.

Fig. 3 is a fragmentary section on the line 3—3 of Fig. 1.

Fig. 4 is a fragmentary section on the line 4—4 of Fig. 2.

Fig. 5 is a view similar to Fig. 1, but illustrating different forms of elastic inserts.

Fig. 6 is a view similar to Fig. 2, showing modified inserts.

Fig. 7 is a section on line 7—7, of Fig. 5.

Fig. 8 is a fragmentary section on the line 8—8 of Fig. 6.

Fig. 9 is a perspective view of a cover having a still further type of rubber inserts, and in which means are provided for detachably securing the side, front and rear panels of the seat and back rest into box-like formation.

Fig. 10 is a perspective view showing the cover of Fig. 9, in position, and,

Fig. 11 is a perspective view of an upper corner of the seat back.

Now referring specifically to the drawings, in which like reference numerals indicate like parts throughout the several views, A indicates the preformed cover for the chair seat and back. In this structure the seat-covering portion is formed of side panels 1, 1, and a front panel 2, each being of a width and length to properly fit over the sides and front of the seat frame, as will be understood. The cover 5 for the top of the seat is integrally connected to an elongated panel 6 which extends upwardly over the front of the back rest. The rear back-rest panel 7 is complementary to the panel 6 in forming a box-like envelope adapted to cover the seat back. As here illustrated, a strip of elastic webbing 8 is positioned between and stitched to each of the side edges of the panels 6 and 7, for a purpose to be hereinafter referred to, the webbing extending upwardly over the side edges of the back rest, and around the corners thereof, terminating at a point short of the center of the top edge, where the panels 6 and 7 are integrally connected for purposes of durability and strength.

The rear panel 7 is extended downwardly at its lower end, to permit the side panels 1 to be stitched at 1' to the inserts 8, 8, and the seat cover 5 is stitched at 5' to each of the top edges of the vertical panels 1, 1.

Each front corner of the box-like structure forming the seat-covering portion, is provided with a vertically-extending insert 9, of elastic webbing, secured by stitching to the adjacent edges of the panels 1 and 2.

The lower edges of the connected panels 1, 2 and 7, are provided with a hem and are so connected that a retaining cord 10 may be extended therethrough to permit the ends of the cord, projecting through the hem in the panel 7, to be connected to retain the cover in the position illustrated in Fig. 2. Preferably the panels 1, 2 and 7 may be fabricated to extend downwardly somewhat below the frame of the seat, if desired, and a strong pull on the cord 10 will cause the lower edges of said panels to be drawn under the frame, the elastic inserts 8 and 9 readily distending to permit of such operation.

Figs. 5 to 8 show a somewhat modified position and shape of the resilient inserts 8. In this structure a strip of the resilient webbing 11 extends centrally down the panel 7, instead of along the side edges thereof, and inserts 12, 12 are provided at the upper corners, it being noted that each of the inserts 12, 12 terminates short of the upper end of the insert 11, to provide strengthening points 13, 13, integral with the panel 7. In this structure the inserts 9, 9 are retained, and the rear end of the side panels 1, 1, are stitched directly to the adjacent lower side edge of the panel 7, the cord 10 extending through the continuous hem formed in the connected panels, and projecting from the hem at one of the lower corners of the box-like structure formed by the panels.

As illustrated in Figs. 1, 2, 5 and 6, the side edges of the seat cover 5 are stitched to the proximate upper edges of the panels 1, to a point adjacent the rear edge of the seat, leaving a relatively small space or opening $x$, where cover 5 is unstitched. Such opening $x$ is advantageous in that it facilitates the adjustment of the cover to seats of different dimensions from front to rear. Automobiles vary in design as well as in dimensions. In some types the back rest cushion extends downwardly in contact with the seat cushion, and in others there is an open space between the lower edge of the back rest and the top of the seat. In either structure, the provision of the openings $x$ facilitates the operation of drawing the lower inner edge of the seat cover rearwardly, and into the space between the seat and lower edge of the back rest, whereby to insure that the cover for the seat and the back rest will be retained in unwrinkled condition.

Figs. 9, 10 and 11 illustrate a modification, wherein a box-like formation of the seat cover is formed after the cover A is laid in position on the chair seat. The structure here shown provides front and rear panels 14 and 15 stitched at their side edges to provide an envelope B, adapted to fit over the back rest, the panel 14 being integral with the seat covering portion 16. A panel 17 is adapted to the front face of the seat frame and side panels 18, 18, are provided to cover the sides of said frame. The panels 18, 18 are elongated rearwardly to provide extensions 19, 19 adapted to extend around the rear corners of the seat frame and to be secured, each to each, by cords 20. The rear panel 15 for the back rest is provided with an apron 21 which hangs downwardly and covers the connected ends 19, 19 of the side panels. The lower edge of the apron 21 is equipped with cords 22, which, when the cover is in position, extend under the seat frame for connection with cords 23, 23, carried by the lower edge of the front panel 17.

When the cover is applied to a seat such as illustrated in Fig. 10, cords 24, 24 are provided to secure the cover to the side posts 25, 25. Rubberized inserts 26 are provided at the front corners of the seat.

The structure disclosed in Figs. 9 to 11 is adaptable to seats of various dimensions, as explained in my co-pending application, Ser. No. 434,900, filed March 11, 1930, other very important advantages being derived by the addition of rubberized inserts in the corners of the seat cover, and in the panel forming the cover for the rear surface of the back rest.

In Figs. 9 to 11 I have shown still further modifications of the rubberized inserts which are incorporated in the panel 15 of the back rest. These modifications comprise a relatively narrow strip of rubberized fabric 27 stitched to the panel 15, and which extends upwardly through the lower edge of the apron 21 of the rear panel 15 to a point somewhat short of the top of the panel 15, where it connects with and is stitched to two diverging rubberized fabric strips 28 and 29, each of which is directed towards and terminates at an upper corner of the said panel 15.

The advantages of the rubberized inserts 26, 27, 28 and 29, are clearly obvious, in that they permit application of the cover, in unwrinkled condition, to seats and back rests of various dimensions, provided the outlines of the seats and back rest are generally identical. It may be applied to a relatively small seat and back structure with comparatively little expansion of the inserts during the necessary adjusting pulls on the adjusting cords 10, 20, 22 and 23, or, on larger seats and backs, the same cover may be adapted by greater stress upon the adjusting cords, causing greater distention of said inserts. In addition thereto the inherent resiliency of the inserts obviously places the cover material under constant tension, resulting in an unwrinkled cover at all times.

Modifications of the structure herein described may be suggested to those skilled in the art, but my invention includes all embodiments falling fairly within the scope of the appended claim.

I claim:—

A combined cover for automobile front seats and back rests, consisting of rigidly connected sections of flexible material shaped to substantially the contour of the top, front and two side walls of the seat cushion and the front and back walls of the back rest, the section for covering the back of the back rest extending downwardly to substantially the plane of the lower edges of the front and side wall sections, and longitudinal elastic insert sections connected between the front and two side wall sections at the front corners of the seat cushion and also between said two side wall sections and the downwardly extending portion of the back section for the back rest to provide a cover portion for seat cushions which may vary in size, said last two elastic insert sections extending upwardly between the front and back wall sections for the back rest and over and inwardly beyond the upper corners thereof providing elastic connections therebetween terminating in spaced relation with respect to each other leaving a rigid connection between said front and back cover sections over the top portion of the back rest to provide an expansible and contractable cover for the back rest which will snugly accommodate seat back rests which may vary in size and in the contour of their upper corners.

In testimony whereof I hereunto affix my signature.

JOHN W. WHALEY.